US012644536B2

(12) United States Patent
Rau et al.

(10) Patent No.: US 12,644,536 B2
(45) Date of Patent: Jun. 2, 2026

(54) SHUT-OFF VALVE AND CONTROL METHOD FOR CONTROLLING A HYDROGEN FLOW FROM A PRESSURIZED TANK

(71) Applicant: Robert Bosch GmbH, Stuttgart (DE)

(72) Inventors: Andreas Rau, Stuttgart (DE); Joachim Soubari, Ettlingen (DE); Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 18/574,830

(22) PCT Filed: Jun. 23, 2022

(86) PCT No.: PCT/EP2022/067232
§ 371 (c)(1),
(2) Date: Dec. 28, 2023

(87) PCT Pub. No.: WO2023/285104
PCT Pub. Date: Jan. 19, 2023

(65) Prior Publication Data
US 2025/0137549 A1 May 1, 2025

(30) Foreign Application Priority Data

Jul. 12, 2021 (DE) ..................... 10 2021 207 320.4

(51) Int. Cl.
*F16K 31/40* (2006.01)
*F17C 13/04* (2006.01)

(52) U.S. Cl.
CPC ............ *F16K 31/408* (2013.01); *F17C 13/04* (2013.01); *F17C 2205/0326* (2013.01);
(Continued)

(58) Field of Classification Search
CPC ..................... F16K 31/408; F17C 13/04; F17C 2205/0326; F17C 2205/0332;
(Continued)

(56) References Cited

U.S. PATENT DOCUMENTS 5,469,828 A 11/1995 Heimberg et al.
2007/0040134 A1* 2/2007 Petersen ............... F16K 31/408
251/30.01
(Continued)

FOREIGN PATENT DOCUMENTS

JP 2007032751 A 2/2007
JP 2012189103 A 10/2012
(Continued)

OTHER PUBLICATIONS

Translation of International Search Report for Application No. PCT/EP2022/067232 dated Oct. 18, 2022 (2 pages).

*Primary Examiner* — Marina A Tietjen
(74) *Attorney, Agent, or Firm* — Michael Best & Friedrich LLP

(57) ABSTRACT

The invention relates to a shut-off valve (100) for controlling a pressurized gas flow from a pressurized gas vessel (109) into a chamber (111) in a system, the shut-off valve (100) comprising a main valve (101), a pilot valve (103), a coil (105) and a tension spring (107); when the coil is energized, it moves the pilot valve from a first pilot valve position into a second pilot valve position; in the first pilot valve position, the pilot valve gas-tightly seals a control channel (115) in the main valve between a control chamber (117) of the shut-off valve and the chamber (109) in the system, and in the second pilot valve position, the pilot valve opens the control channel; the tension spring mechanically couples the pilot valve to the main valve in order to move the main valve from a first main valve position into a second main valve position when the pilot valve moves into the second pilot valve position; in
(Continued)

the first main valve position, the main valve gas-tightly seals a main channel (123) that connects the pressurized gas vessel to the chamber in the system, while in the second main valve position, the main valve opens the main channel (123).

11 Claims, 3 Drawing Sheets

(52) U.S. Cl.
CPC *F17C 2205/0332* (2013.01); *F17C 2221/012* (2013.01); *F17C 2270/0168* (2013.01); *F17C 2270/0184* (2013.01)

(58) Field of Classification Search
CPC ........ F17C 2221/012; F17C 2270/0168; F17C 2270/0184
See application file for complete search history.

(56) References Cited

U.S. PATENT DOCUMENTS

| | | | | |
|---|---|---|---|---|
| 2016/0161018 | A1* | 6/2016 | Zeiner | ................ F02M 21/0239 |
| | | | | 251/25 |
| 2017/0248274 | A1 | 8/2017 | Ozaki | |
| 2018/0038507 | A1 | 2/2018 | Ninomiya et al. | |
| 2019/0331249 | A1* | 10/2019 | Borja | ........................ F16K 1/44 |

FOREIGN PATENT DOCUMENTS

| | | | |
|---|---|---|---|
| JP | 2013230808 | A | 11/2013 |
| JP | 2014105755 | A | 6/2014 |
| JP | 2016156485 | A | 9/2016 |
| JP | 2017150627 | A | 8/2017 |

* cited by examiner

SHUT-OFF VALVE AND CONTROL METHOD FOR CONTROLLING A HYDROGEN FLOW FROM A PRESSURIZED TANK

BACKGROUND

Hydrogen is often used as a fuel for operating fuel cells, but also combustion engines. Since hydrogen is highly explosive, it must be stored safely in a pressurized tank. Shut-off valves are used to control a hydrogen flow from a pressurized tank.

SUMMARY

Presented the context of this invention are a shut-off valve, a control method, a pressurized tank, and a vehicle. Further features and details of the invention will emerge from the description and the drawings. In this context, features and details described in connection with the shut-off valve according to the invention obviously also apply in connection with the control method according to the invention or the pressurized tank according to the invention, and the vehicle according to the invention, and vice versa in each case, so that reference is or can always be made mutually with regard to the disclosure concerning the individual aspects of the invention.

The invention presented serves in particular to enable robust and reliable control of a hydrogen flow from a pressurized tank.

Therefore, presented in a first aspect of this invention is a shut-off valve for controlling a hydrogen flow from a pressurized gas vessel in a chamber in the system. The shut-off valve comprises a main valve, e.g., a nozzle needle, a pilot valve, a coil, and a tension spring.

The coil is configured to move the pilot valve from a first pilot valve position into a second pilot valve position when the coil is energized.

In the first pilot valve position, the pilot valve gas-tightly seals a control channel in the main valve between a control chamber of the shut-off valve and the chamber in the system.

In the second pilot valve position, the pilot valve opens the control channel in the main valve and is retracted into a control chamber above the pilot valve.

The tension spring mechanically couples the pilot valve to the main valve and provides a pulling force on the main valve in order to move the main valve from a first main valve position into a second main valve position when the pilot valve moves into the second pilot valve position.

In the first main valve position, the main valve gas-tightly seals a main channel that connects the pressurized gas vessel to the chamber in the system, while in the second main valve position, the main valve opens the main channel.

A shut-off valve in the context of the present invention is understood to mean a shut-off valve for shutting off and opening a fluidically conductive path.

In the context of the invention presented, a tension spring is understood to mean a spring element, such as a mechanical spring or an elastic element, which provides a pulling force in the deflected state in order to move to an undeflected position or a rest position.

In the context of the invention presented, a pressurized gas vessel is understood to mean a chamber in which hydrogen at high pressure, in particular at a pressure of up to 1100 bar, is stored.

In the context of the invention presented, a "chamber in the system" is understood to mean a space located downstream of the shut-off valve that can typically withstand pressures between atmospheric pressure and the accumulator pressure in the pressurized gas vessel.

The invention presented is based on two movable valves, i.e., a pilot valve which adjusts a hydrogen flow or gas flow and, as a result, a pressure profile in the shut-off valve, as well as a main valve which adjusts a hydrogen flow from the shut-off valve or through the shut-off valve.

According to the invention, the pilot valve and the main valve interact in order to enable robust and reliable movement of the main valve between a first main valve position, e.g., a shut-off position, and a second main valve position, e.g., an open position.

The shut-off valve presented connects a main channel to a pressurized gas vessel, which is usually a pressurized tank having a chamber in the system, which tank is typically able to supply fuel, particularly hydrogen, via a fluidically conductive connection, e.g., a fuel cell system or a combustion engine. In order to adjust a pressure level, e.g., in a fuel cell system or a combustion engine, the latter or former are typically indirectly connected to the chamber in the system via pressure reducers. In the main channel, the main valve of the shut-off valve is movably arranged so that the main valve prevents or blocks a flow of hydrogen or gas from the pressurized gas vessel into the chamber in the system when the main valve is in the first main valve position and, e.g., projects into the main channel or gas-tightly seals the main channel. In the second main valve position, the main valve releases a hydrogen flow from the pressurized gas vessel into the chamber in the system, e.g., via a spaced position to the main channel.

In order to enable the main valve to move from the first main valve position into the second main valve position, the shut-off valve presented combines a pneumatic compressive force generated by a pressure difference within the shut-off valve with a mechanical force provided by the tension spring provided according to the invention.

The pneumatic compressive force is provided in the presented shut-off valve by way of a control chamber concept. In other words, a control chamber is used to regulate a backpressure that opposes a high pressure acting on the main valve from the pressurized gas vessel. Accordingly, no moving force acts on the main valve when the control chamber has the same high pressure as the pressure acting on the main valve from the pressurized gas vessel. In other words, a moving force acts on the main valve if there is a pressure in the control chamber that is lower than the high pressure acting on the main valve from the pressurized gas vessel, such that the high pressure moves the main valve or a compressive force on the main valve due to a pressure difference between the pressurized gas vessel and the control chamber.

In order to control a pressure difference between the pressurized gas vessel and the control chamber, the presented shut-off valve comprises a pilot valve. The pilot valve is movable between a first pilot valve position in which the pilot valve gas-tightly seals a control channel in the main channel and a second pilot valve position in which the pilot valve opens the control channel.

In a home position, where the shut-off valve prevents hydrogen from flowing out of the pressurized gas vessel, the high pressure present in the pressurized gas vessel acts on the pilot valve and pushes the pilot valve into or onto the control channel, so that the control channel is gas-tight.

To release a hydrogen flow from the pressurized gas vessel, the coil of the shut-off valve is energized, i.e., supplied with electricity, so that a magnetic force is built up that pulls the pilot valve to the second pilot valve position.

Given the applied high pressure, the pilot valve is in this case initially only slightly raised or moved to a pilot valve auxiliary position in which hydrogen can pass through the control channel so that hydrogen flows from the control chamber into the chamber in the system and a pressure in the control chamber is reduced. Given the reduced pressure, the magnetic force is able to pull the pilot valve into the second pilot valve position.

When moving the pilot valve to the second pilot valve position, a receiving space is opened below the pilot valve or between the pilot valve and the main valve, to which the main valve can move when a pressure in the receiving space is minimized by hydrogen flowing into the chamber in the system via the control channel.

In order to support a movement of the main valve from the first main valve position to the second main valve position or into the receiving space, or to enable such a movement already at a low pressure difference and correspondingly quickly, the tension spring provided according to the invention provides a pulling force on the main valve when the pilot valve moves to the second pilot valve position. Accordingly, the pulling force interacts or additionally acts with a pneumatic compressive force acting on the main valve by the pressurized gas vessel.

To close or shut off the shut-off valve, energizing the coil is interrupted such that a compressive force provided by a compression spring pushes the pilot valve to the first pilot valve position, the pilot valve gas-tightly seals the control channel, and a high pressure is established in the control chamber that pushes the pilot valve onto the main valve and the main valve into the main channel or into the first main valve position.

It can be provided that the control chamber is arranged over the pilot valve and the pilot valve comprises an auxiliary control channel connecting the control chamber to the control channel in the main valve such that the pilot valve moves into the control chamber as it moves to the second pilot valve position.

By means of a control chamber arranged over the pilot valve, a pressure acting on the pilot valve can be adjusted and a movement of the pilot valve can be controlled accordingly. By means of a control chamber in which a reduced pressure compared to a pressurized gas vessel can be adjusted, it is possible to reliably and quickly move the pilot valve by additive acting forces, i.e., a magnetic force provided by the coil and a pneumatic pressure provided by a pressure difference. To this end, an auxiliary control channel enables hydrogen to flow out of the control chamber through the pilot valve and through the control channel into the chamber in the system.

It can further be provided that the shut-off valve comprises a receiving space for receiving the main valve in the second main valve position, wherein the receiving space is arranged between the pilot valve and the main valve and fluidically connects the auxiliary control channel to the control channel.

In one advantageous embodiment, the auxiliary control channel comprises a flow restriction point configured to suppress or slow down the opening movement of the pilot valve, thus preventing bouncing at the stroke stop.

It can further be provided that a movement of the pilot valve into the second pilot valve position causes the receiving space to open in order to receive the main valve in the second main valve position.

A receiving space for receiving the main valve in the second main valve position, which is blocked by the pilot valve in the first pilot valve position, ensures a successive movement of the pilot valve first from the first pilot valve position to the second pilot valve position and a subsequent movement of the main valve from the first main valve position to the second main valve position.

It can be provided that the main valve comprises a stroke limitation on the housing side such that the main valve stroke is less than the pilot valve stroke and, when the pilot valve (103) is fully open and the main valve is fully open, the pilot valve seat remains open and a pressure equalization can take place between the control channel, receiving chamber, auxiliary control channel, and control chamber can occur.

It can be provided that the pneumatic separation of the control chamber from the pressurized gas vessel takes place via guides between the pilot valve and the housing, or the main valve and the pilot valve.

In a further advantageous embodiment, the pneumatic separation can alternatively also be performed by means of conventional sealing elements such as O-rings, sealing lips or membranes in or on the guides, which enables a strong pressure reduction in the control chamber and thereby also a particularly large opening force on the pilot valve and main valve. In this case, in order to still ensure a secure sealing during the closing operation after switching off the magnetic force effect, an alternative pneumatic restrictive connection must be provided between the control chamber and the pressurized gas vessel. However, in contrast to a guide, this can be provided in a particularly simple manner in terms of production methods, e.g., via a radial restrictor bore between the additional control bore and the high-pressure area at the level of the tension spring or, e.g., radially in the main valve between the receiving space and the high-pressure range. However, a restrictor bore can also be provided in the housing between the high-pressure area and the control chamber.

It can further be provided that the shut-off valve comprises a compression spring configured to push the pilot valve to the first pilot valve position and the main valve into the first main valve position when the coil is de-energized.

A compressive spring enables a secure and reliable shut-off of the shut-off valve even in the event of a fault of an electrical supply to the shut-off valve.

It can further be provided that the pilot valve comprises a first coupling element for mechanically coupling to a first counter-coupling element of the tension spring, and the main valve comprises a second coupling element for mechanically coupling to a second coupling element of the tension spring.

By means of coupling elements and counter-coupling elements, e.g. hooks and eyes, a secure connection of the pilot valve, the tension spring, and the main valve can be achieved such that a flow of force from the pilot valve to the main valve is ensured when the pilot valve moves from the first pilot valve position into the second pilot valve position.

A second aspect of the invention presented relates to a control method for controlling a hydrogen flow from a pressurized tank by means of a shut-off valve, the shut-off valve comprising a main valve, a pilot valve, a coil, and a tension spring. The control method comprises an opening step for opening the shut-off valve, in which the coil is energized with electrical current to move the pilot valve from a first pilot valve position into a second pilot valve position such that the pilot valve opens a control channel in the main valve between a control chamber of the shut-off valve and a chamber in the system, and hydrogen in the control chamber flows into the chamber in the system, whereby a tension spring mechanically couples the pilot valve to the main valve and a pulling force is provided on the main valve, moving the main valve from a first main valve position into a second main valve position and a main channel connecting a pressurized gas vessel to the chamber in the system. The control method further comprises a shut-off step for shutting off the shut-off valve, in which the coil is de-energized so that a compression spring moves the pilot valve from the second pilot valve position into the first pilot valve position, and the pilot valve gas-tightly seals the control channel in the main valve, and the main valve gas-tightly seals the main channel.

The method presented is particularly useful for operating the fuel cell system presented.

A third aspect of the present invention relates to a pressurized tank system having a possible embodiment of the shut-off valve presented.

In a fourth aspect, the invention presented relates to a vehicle having a possible embodiment of the pressurized tank system presented.

Further advantages, features, and details of the invention will emerge from the following description, in which exemplary embodiments of the invention are described in detail with reference to the drawings. In this context, the features mentioned in the claims and in the description can each be essential to the invention individually or in any combination.

BRIEF DESCRIPTION OF THE DRAWINGS

Shown are:

FIGS. 1a to 1f a sequence of one possible embodiment of the presented control method with a possible embodiment of the presented shut-off valve, FIG. 2 one possible embodiment of the vehicle presented with a possible embodiment of the pressurized tank system presented.

DETAILED DESCRIPTION

Figures 1A, 1B, 1C:
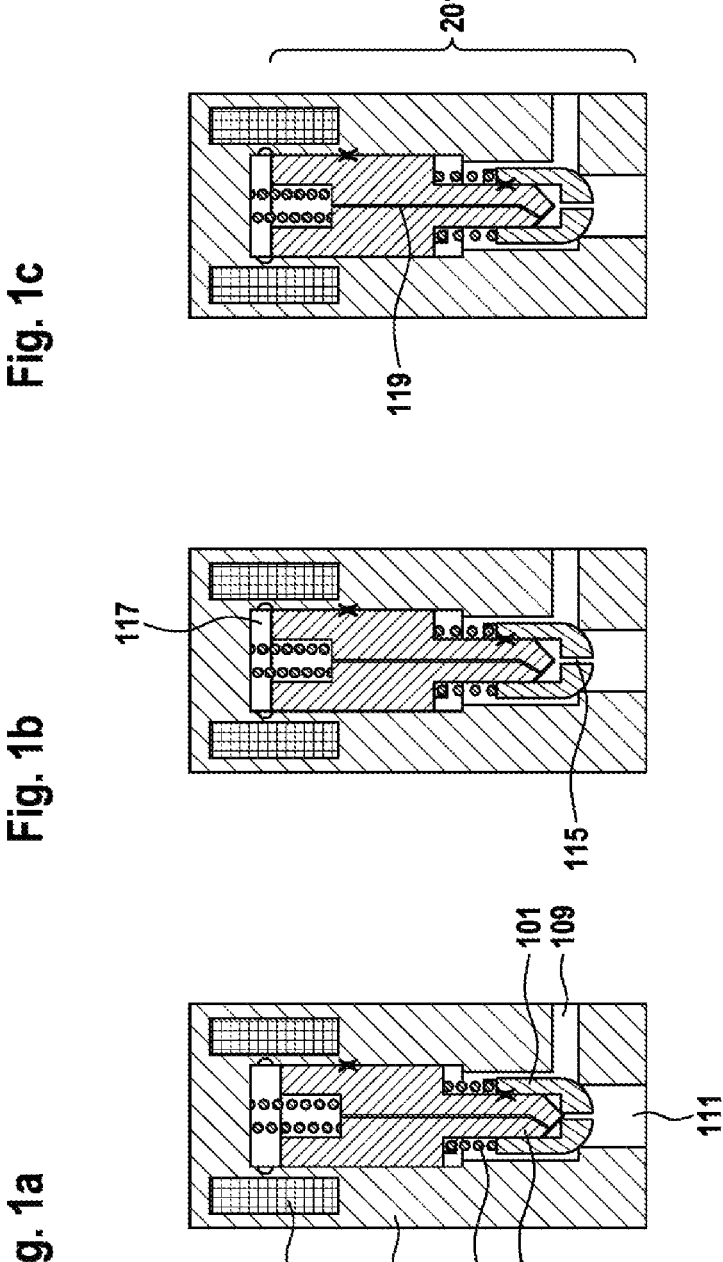

In FIG. 1a, a shut-off valve 100 is shown. The shut-off valve 100 includes a main valve 101, a pilot valve 103, a coil 105, and a tension spring 107.

In FIG. 1a, the shut-off valve 100 is shown in a shut-off state in which a hydrogen flow from a pressurized gas vessel 109 into a chamber 111 in the system is prevented or blocked by the main valve 101.

In an opening step 201 for opening the shut-off valve 100, the coil 105 is energized so that a magnetic force is provided that moves the pilot valve 103 against a spring force of a compression spring 113 to a deflected position or a pilot valve auxiliary position, as shown in FIG. 1b, in which a control channel 115 is opened in the main valve 101.

By releasing the control channel 115, hydrogen or gas flows from a control chamber 117 via an auxiliary control channel 119 and the control channel 115 into chamber 111 in the system, as indicated in FIG. 1c. The control channel 115 and the auxiliary control channel 119 in this case each act as restrictors. Accordingly, a pressure in the control chamber 117 drops such that the magnetic force provided by the coil 105 moves the pilot valve 103 to the second pilot valve position shown in FIG. 1d.

It can further be provided that the main valve 101 can also be opened via purely electromagnetic forces, e.g., in the case of the same or similar pressure levels in the high-pressure region 109 as well as in the area in the system 111, i.e., an operating state in which no or only minor supporting pneumatic opening forces are present on the main valve by the control chamber concept, which are thereby transferred from the pilot valve to the main valve via the spring.

Figures 1D, 1E, 1F:
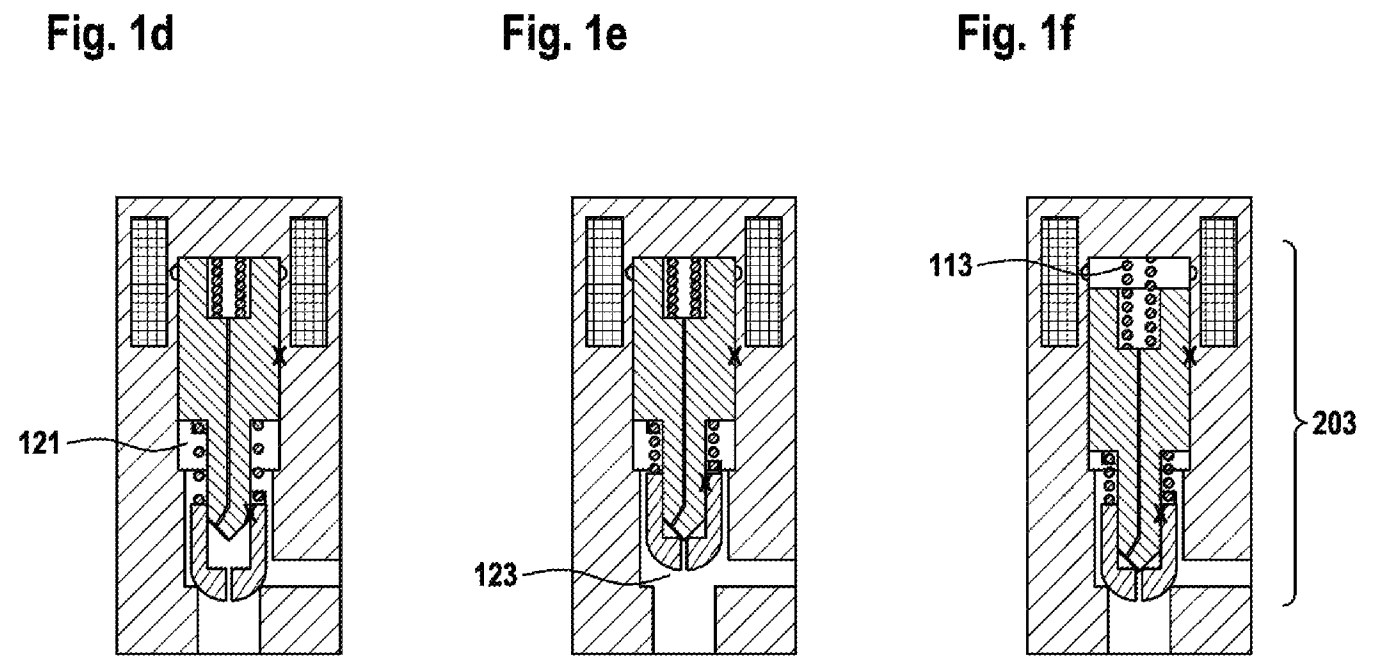

The pilot valve 103 is mechanically coupled to the main valve 101 via the tension spring 107 such that the tension spring 107 is deflected from the first pilot valve position into the second pilot valve position upon movement of the pilot valve 103, and a pulling force provided by the tension spring 107 is gradually transferred to the main valve 101 in order to move the main valve 101 from the first main valve position shown in FIG. 1c into the second main valve position shown in FIG. 1d.

In FIG. 1d, the pilot valve 103 is shown in the second pilot valve position, in which the pilot valve 103 is fully deflected and retracted into the control chamber 117. Accordingly, a maximum pulling force on the main valve 101 by the tension spring 107 together with a compressive force applied to the main valve 101 due to a pressure difference between a receiving space 121 and the pressurized gas vessel 109 additively interact to move the main valve 101 into the second main valve position, as shown in FIG. 1e.

Once the main valve 101 is in the second main valve position, a main channel 123 used for connecting the pressurized gas vessel 109 to the chamber 111 in the system is opened so that hydrogen and gas can flow from the pressurized gas vessel 109 into the chamber 111 in the system.

To shut off the main channel 123 in a shut-off step 203, the coil 105 is de-energized as shown in FIG. 1f, such that the compression spring 113 causes the pilot valve 103 to make a closing movement from the second pilot valve position towards the main valve. Once the pilot valve contacts the main valve, the control channel 115 is closed and a mechanical force is applied to the main valve via the pilot valve seat. In addition, the pressure in the control chamber then rises due to the filling via the restriction gap. The combination of the compression spring 113 that mechanically applies a closing force to the main valve via the pilot valve seat and simultaneous filling of the control chamber results in a joint closing movement of the assembly consisting of the pilot valve and main valve.

Figure 2:
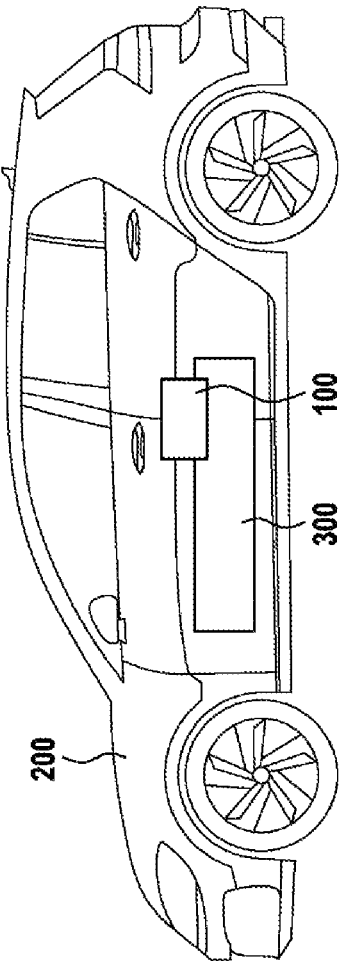

A vehicle 200 is shown in FIG. 2. The vehicle 200 comprises a pressurized tank system 300 having a shut-off valve 100 according to FIG. 1.

The invention claimed is:

1. A shut-off valve (100) for controlling a pressurized gas flow from a pressurized gas vessel (109) into a chamber (111) in a system, wherein the shut-off valve (100) comprises:
   a main valve (101),
   a pilot valve (103),
   a coil (105),
   and a tension spring (107), wherein the coil (105) is configured to move the pilot valve (103) from a first pilot valve position to a second pilot valve position when the coil (105) is energized, wherein, in the first pilot valve position, the pilot valve (103) gas-tightly seals a control channel (115) in the main valve (101) between a control chamber (117) of the shut-off valve (100) and the chamber (111) in the system, and in the second pilot valve position, the pilot valve (103) opens the control channel (115) in the main valve (101) such that the pressurized gas flows from the control chamber (117), through the control channel (115), and to the chamber (111) in the system and the pilot valve (103) is retracted into the control chamber (117) above the pilot valve (103), wherein the tension spring (107) mechanically couples the pilot valve (103) to the main valve (101) and applies a pulling force to the main valve (101) in order to move the main valve (101) from a first main valve position into a second main valve position when the pilot valve (103) moves into the second pilot valve position, wherein in the first main valve position, the main valve (101) gas-tightly seals a main channel (123) that connects the pressurized gas vessel (109) to the chamber (111) in the system, while in the second main valve position, the main valve (101) opens the main channel (123), wherein the control chamber (117) is arranged above the pilot valve (103), and the pilot valve (103) comprises an auxiliary control channel (119) defined by a bore inside the pilot valve (103) connecting the control chamber (117) to the control channel (115) in the main valve (101) such that the pilot valve (103) moves into the control chamber (117) when the pilot valve (103) moves to the second pilot valve position.

2. The shut-off valve (100) according to claim 1, wherein the shut-off valve (100) comprises a receiving space (121) for receiving the main valve (101) in the second main valve position, wherein the receiving space (121) is arranged between the pilot valve (103) and the main valve (101), and the auxiliary control channel (119) is fluidically connected to the control channel (115).

3. The shut-off valve (100) according to claim 2, wherein a movement of the pilot valve (103) into the second pilot valve position causes the receiving space (121) to open in order to receive the main valve (101) in the second main valve position.

4. The shut-off valve (100) according to claim 2, wherein the main valve (101) comprises a stroke limitation means on a housing side that causes a main valve stroke to be less than a pilot valve stroke and, when the pilot valve (103) is fully open and the main valve (101) is fully open, a pilot valve seat remains open and a pressure balance between the control channel (115), the receiving space (121), the auxiliary control channel (119), and the control chamber (117) is able to take place.

5. The shut-off valve (100) according to claim 1, wherein a pneumatically restrictive connection is provided between the control chamber and the pressurized gas vessel.

6. The shut-off valve (100) according to claim 1, wherein the shut-off valve (100) comprises a compression spring (113) configured to push the pilot valve (103) into the first pilot valve position and the main valve (101) into the first main valve position when the coil (105) is de-energized.

7. The shut-off valve (100) according to claim 1, wherein the pilot valve (103) comprises a first coupling element for mechanical coupling to a first counter-coupling element of the tension spring (107), and the main valve (101) comprises a second coupling element for mechanical coupling to a second coupling element of the tension spring (107).

8. A pressurized tank system (300) having a shut-off valve (100) according to claim 1.

9. A vehicle (200) having a pressurized tank system (300) according to claim 8.

10. The shut-off valve (100) according to claim 6, wherein the compression spring (113) is located within the control chamber (117).

11. A control method for controlling a pressurized gas flow from a pressurized tank (300) via a shut-off valve (100), wherein the shut-off valve (100) comprises:

a main valve (101), a pilot valve (103), a coil (105), and a tension spring (107), wherein the control method comprises:

an opening step (201) for opening the shut-off valve (100), in which the coil (105) is energized with electrical current to move the pilot valve (103) from a first pilot valve position into a second pilot valve position such that the pilot valve (103) opens a control channel (115) in the main valve (101) between a control chamber (117) of the shut-off valve (100) and a chamber in a system (111), and a pressurized gas in the control chamber (117) flows through the control channel (115) into the chamber (111) in the system, wherein the tension spring (107) mechanically couples the pilot valve (103) to the main valve (101), and a pulling force is provided on the main valve (101), which force moves the main valve (101) from a first main valve position into a second main valve position and a main channel (123) connecting a pressurized gas vessel (109) to the chamber (111) in the system;

a shut-off step (203) for shutting off the shut-off valve (100), in which the coil (105) is de-energized so that a compression spring (113) moves the pilot valve (103) from the second pilot valve position into the first pilot valve position, and the pilot valve (103) gas-tightly seals the control channel (115) in the main valve (101), and the main valve (101) gas-tightly seals the main channel (123), wherein the control chamber (117) is arranged above the pilot valve (103), and the pilot valve (103) comprises an auxiliary control channel (119) defined by a bore inside the pilot valve (103) connecting the control chamber (117) to the control channel (115) in the main valve (101) such that the pilot valve (103) moves into the control chamber (117) when the pilot valve (103) moves to the second pilot valve position.

\* \* \* \* \*